Patented May 6, 1947

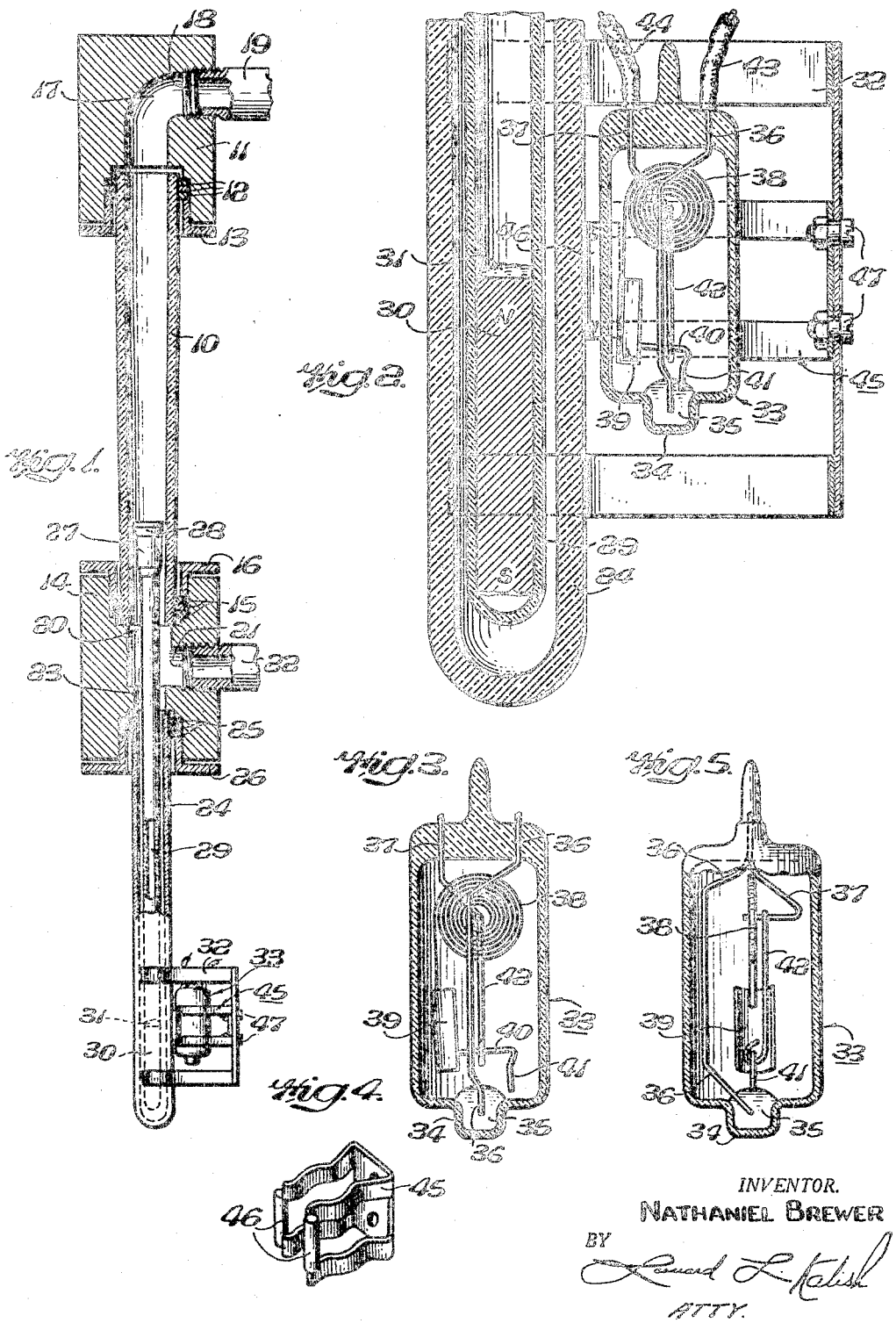

2,419,942

UNITED STATES PATENT OFFICE 2,419,942

FLOW ACTUATED SWITCH

Nathaniel Brewer, Hatfield, Pa., assignor to Fischer & Porter Company, Hatboro, Pa., a corporation of Pennsylvania Application October 18, 1943, Serial No. 506,675

7 Claims. (Cl. 200—31)

The present invention relates to measuring instruments, and it relates more particularly to flow meters and to automatic alarms for flow meters and other measuring instruments.

An object of the present invention is to provide a simple, inexpensive, sensitive, and dependable alarm for measuring instruments. Another object of the present invention is to provide signalling mechanism which will automatically respond when a variable condition drops below or rises above a predetermined value. Still another object of the present invention is to provide mechanism which will automatically respond to excessive or insufficient flow-rates and which is sufficiently sensitive to permit practical installation and dependable operation. A further object of the present invention is to provide mechanism which will automatically respond to excessive or insufficient flow-rates and which will not give secondary or false responses.

Other objects and advantages of the present invention are apparent in the following detailed description, claims and accompanying drawings.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a view, partly in elevation and partly in vertical cross-section, of one embodiment of the present invention.

Figure 2 represents a vertical cross-sectional view on an enlarged scale, showing the signalling mechanism as it appears in closed or operating position.

Figure 3 represents a side elevational view of the mercury switch forming part of the signalling mechanism of Figure 2, as it appears in its normal open position.

Figure 4 represents a perspective view of the auxiliary magnet clamp.

Figure 5 represents a side elevational view of the mercury switch taken generally at right angles to the view of Figure 3.

In the embodiment of Figures 1 to 4, a vertically extending downwardly-tapered metering tube 10, which may be of glass or synthetic plastic or other suitable material, has its upper end held in fluid-tight sealing relationship with an upper outlet fitting 11 by means of packing rings 12 and a stuffing gland 13 and has its lower end similarly held in fluid-tight sealing relationship with a lower inlet fitting 14 by means of packing rings 15 and a stuffing gland 16. The fitting 11 has a conduit 17 formed therein leading from the upper end of the metering tube 10 and terminating in an outlet opening 18 to which an outlet pipe-line 19 is adapted to be connected.

The lower inlet fitting 14 is provided with a conduit 20 leading from the lower end of the metering tube 10 and terminating in an inlet opening 21 to which an inlet pipe-line 22 is adapted to be connected.

The inlet fitting 14 also contains an opening 23 which connects with a downwardly extending tube 24 held in fluid-tight sealing relationship with said fitting 14 by means of packing rings 25 and a stuffing gland 26; the tube 24 being closed at its lower end.

A metering float 27 having a flow-constricting head portion 28 is adapted for free up-and-down movement within the metering tube 10; the position of the metering float 27 within the tapered meter tube 10 indicating rate-of-flow of fluid moving upwardly through said tube 10 in a manner well known in the art.

A tube 29 extends downwardly from the metering float 27, through the connecting opening 23 in the inlet fitting 14 and into the closed tube 24. The extension tube 29 is closed at its lower end in which is positioned a bar magnet 30 having its south pole at the bottom and its north pole at the top. A layer of sealing wax 31 within said extension tube 29 provides a fluid-tight seal for said magnet 30. The magnet 30 may be of magnetized iron or suitable iron alloy, such as Alnico.

The tubes 24 and 29 may be made of glass or other suitable non-magnetic material.

A magnetically-actuated indicating mechanism to be described hereinbelow is carried by a frame 32 which is mounted upon the tube 24 and which is adapted to be moved vertically along said tube 24.

The indicating mechanism includes a sealed-glass mercury switch indicated generally by the reference character 33. The switch 33 is provided with a small well 34 containing a bead of mercury 35.

A fixed electrode 36 extends downwardly from the top of the switch 33 and into the mercury bead 35.

An arm 37 is mounted in the top of the switch 33 and supports one end of a spiral hair spring 38, the other end of which extends downwardly and terminates in a plate or flag 39 of iron or the like which is sensitive to magnetism. Extending generally horizontally from the lower edge of the flag is a wire 40, the other end of which terminates in a generally vertically extending movable electrode 41. The horizontal wire 40 is supported intermediate its ends by a looped rod 42 descending from the arm 37.

In its normal position, the switch 33 is open; the movable electrode 41 being held clear of the mercury bead 35 as shown in Figure 3. When, however, sufficient magnetic attraction is brought to bear on the left hand side of the switch, the flag 39 moves toward the left in Figure 3 against the tension of the spiral spring 38 and carries with it the movable electrode 41 so that said movable electrode enters the mercury bead 35 and closes the electric circuit. The upper end of the fixed electrode 36 and the upper end of the arm 37 (which is in electrical connection with the movable electrode 41 through the spring 38, the flag 39 and the wire 40) pass through the wall of the switch 33 and are connected to wires 43 and 44 respectively, which, in turn connect with any suitable electric circuit having any suitable audible and/or visual alarm (not shown).

A clamp 45, shown in Figure 4, is adapted to be removably positioned about the switch 33 and to be fastened to the frame 32, by means of bolts 47.

A pair of small bar magnets 46 of iron or Alnico or the like are connected to the clamp 45 and are supported thereby at the left hand edge of the switch 33.

The north poles of the magnets 46 are placed in line with the flag 39; the south poles of said magnets 46 being above and out of line with said flag 39.

In operation, the frame 32 may be located upon the tube 24 so that a signal may be given to indicate either excessive or insufficient rate-of-flow.

As stated hereinabove, the position of the metering float 27 within the metering tube 10 is dependent upon the rate-of-flow of fluid upwardly through the tube 10; the greater the rate of flow the higher the position of the float and vice versa. It is obvious that, as the float 27 moves, it carries with it the extension tube 29 and the large bar magnet 30.

If the signalling device is to be used to indicate insufficient flow rates, the frame 32 is so positioned upon the tube 24 that, in the predetermined minimum position of the float 27 the north pole of the large bar magnet 30 will be in alignment with the north poles of the small magnets 46 and with the flag 39 as shown in Figure 2.

When the rate-of-flow of fluid is normal, that is above the predetermined minimum the float 27 will be in an elevated position within the metering tube 10 and the large bar magnet 30 will also be above the position shown in Figure 2.

During such normal operation the switch 33 is open; the small magnets 46 being insufficient in strength to move the flag 39.

When, however, the rate-of-flow drops below the predetermined value, the large magnet 30 moves downward until its north pole is in horizontal alignment with the north poles of the small magnets 46. In this position the magnetic force of the magnets is additive and is sufficient to attract the flag 39 and thereby to move the electrode 41 into the mercury bead 35 and thus to close the switch 23 and to actuate the alarm mechanism. Should the rate-of-flow increase thereafter, the metering float 27 will rise within the tube 10 and carry the large magnet 30 out of alignment with the mercury switch 33, whereupon the spring 38 will move the flag 39 and the electrode 41 back to their original position against the insufficient attraction of the auxiliary magnets 46, thereby to re-open the switch.

While it has been suggested in the past to use a magnetically-actuated mercury switch of the general character of the switch 33 in connection with a moving magnet to operate an alarm, the construction of the present invention, utilizing as it does small auxiliary magnets in addition to the main magnet, has several important advantages over conventional alarms.

Thus for example, it has been found in practice that where no small auxiliary magnets are employed, it is impossible to get satisfactory operation of the mercury switch unless the flag of the switch is very close to the main magnet; the practical limit being approximately ⅛". Since the combined thickness of the walls of the tubes 24 and 29, together with the necessary clearance between these tubes exceeds ⅛", conventional magnetically-actuated switches were found to be unreliable in operation.

By employing the novel auxiliary magnets (which themselves are too weak to close the mercury switch) of the present invention, this difficulty is overcome since the additive force of the combined north poles of the main magnet and of the auxiliary magnets is sufficient to actuate the flag 39 and thereby to close the mercury switch at distances several times those heretofore attainable.

Another disadvantage of alarms heretofore used was that the flag 39 (being magnetically neutral) would be attracted by the south pole of the magnet as well as by the north pole. Thus, every time the main bar magnet passed the mercury switch, two impulses would be created, one as the south pole passed the flag and the other as the north pole passed the flag. This double impulse was undesirable since one of the two is a false alarm so that any one hearing or seeing the alarm mechanism go off could not be sure, without going over to inspect the flow meter itself, whether or not the flow-rate had dropped below the predetermined minimum.

By the present construction this double impulse is eliminated since, as the south pole of the main magnet passes the mercury switch its magnetic field is diverted from the flag 39 by the north poles of the auxiliary magnets so that the mercury switch is not closed. Similarly, since the south poles of the auxiliary magnets are above and out of line with the flag, the flag is not actuated when the south pole of the main magnet passes the south poles of the auxiliary magnets.

It can, therefore, be seen that the present construction gives a dependable and unmistakable signal and permits clearances which are required for practical operation.

It is obvious that the frame 32 can be moved vertically along the tube 24 to position the switch and auxiliary magnets at any desired point. Thus, the mechanism can be adjusted to sound an alarm at any predetermined minimum value of flow-rate.

It is also obvious that the mercury switch can be positioned near the top of the tube 24 to indicate excessive flow-rates; the north pole of the main magnet closing the mercury switch when the float 27 rises to a predetermined level within the metering tube 10.

It is also possible to employ two separate switches, one positioned near the bottom of the tube 24 and the other positioned near the top of the tube 24, to actuate separate alarm mechanisms and thus to indicate both excessive and insufficient flow-rates.

While for purposes of illustration the foregoing description refers to the north poles of the auxiliary magnets as being in line with the flag 39, it is obvious that the reverse could be true. That is, the auxiliary magnets 46 could be reversed so that their south poles are in line with the flag 39 and so that the north poles are above the flag. In this case, the flag 39 would be moved and the switch 33 would be closed when and only when the south pole of the main magnet 30 came into vertical alignment with the south poles of the auxiliary magnets 46 and with the flag 39.

In place of, or in addition to, the alarm mechanism hereinabove referred to, it is possible to incorporate valve means into the electrical circuit controlled by the mercury switch 33. Thus, any conventional valve means could be connected, for example, to the inlet pipe-line 22, and could be arranged vertically to open upon insufficient flow-rate or to close upon excessive flow-rate in place of, or in addition to, the alarm mechanism.

While the novel actuating mechanism of the present invention has been described in connection with a flow meter wherein it constitutes a preferred embodiment, it is obvious that the present invention is not limited to this embodiment. Thus, for example, the mercury switch, auxiliary magnets and main magnet construction of the present invention could be used in connection with any other measuring instrument which produces a movement of the main magnet upon change in a variable condition, such as temperature, pressure, etc.

Instead of having the closed tube 24 and the extension tube 29 extend downwardly from the lower fitting 14 as described hereinabove, it is possible to have these elements extend upwardly by merely reversing the fittings 11 and 14, making the fitting 11 the inlet fitting and the fitting 14 the outlet fitting. In such case, the extension tube would extend upwardly from the top of the rotameter float instead of downwardly from the bottom thereof. The use of metering floats having either upward or downward extensions is well known in the rotameter art and is shown, for example, in my co-pending application, Serial No. 498,443, filed August 13, 1943.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what I claim as new and desire to protect by Letters Patent, is:

1. For use with an instrument sensitive to a variable condition, a magnet, means connected to said instrument for moving said magnet responsive to variation in said condition, switch means including a magnetically-actuated make-and-break element disposed adjacent the path of travel of said magnet, and an auxiliary magnet having one pole disposed adjacent said make-and-break element, the pole of said auxiliary magnet alone having insufficient strength to actuate said make-and-break element, but together with the aligned similar pole of the first-mentioned magnet being capable of actuating said make-and-break mechanism.

2. For use with an instrument sensitive to a variable condition, a magnet, means connected to said instrument for moving said magnet responsive to variations in said condition, switch means including a magnetically-actuated make-and-break element disposed adjacent the path of travel of said magnet, and an auxiliary magnet having one pole disposed adjacent said make-and-break element, the pole of said auxiliary magnet alone having insufficient strength to actuate said make-and-break element, but together with the aligned similar pole of the first-mentioned magnet being capable of actuating said make-and-break mechanism, said pole of said auxiliary magnet tending to divert the field of the aligned opposite pole of the first-mentioned magnet thereby to prevent actuation of the make-and-break element by said opposite pole.

3. For use with a flow-meter, a magnet, means connected to said flow-meter for moving said magnet responsive to variations in rate-of-flow, switch means including a magnetically-actuated make-and-break element disposed adjacent the path of travel of said magnet, and an auxiliary magnet having one pole disposed adjacent said make-and-break element, the pole of said auxiliary magnet alone having insufficient strength to actuate said make-and-break element, but together with the aligned similar pole of the first-mentioned magnet being capable of actuating said make-and-break mechanism.

4. For use with a flow-meter, a magnet, means connected to said flow-meter for moving said magnet responsive to variations in rate-of-flow, switch means including a magnetically-actuated make-and-break element disposed adjacent the path of travel of said magnet, and an auxiliary magnet having one pole disposed adjacent said make-and-break element, the pole of said auxiliary magnet alone having insufficient strength to actuate said make-and-break element, but together with the aligned similar pole of the first-mentioned magnet being capable of actuating said make-and-break mechanism, said pole of said magnet tending to divert the field of the aligned opposite pole of the first-mentioned magnet thereby to prevent actuation of the make-and-break element by said opposite pole.

5. In combination with a rotameter having a vertical metering tube and a metering float adapted for free up-and-down movement within said tube, an elongated member connected to said float and extending vertically therefrom beyond said metering tube, a bar magnet disposed at the free end of said elongated member, an electrical switch having a magnetically-actuated movable contact element disposed adjacent the path of travel of said magnet, and an auxiliary magnet having one pole disposed adjacent said movable contact element, the pole of said auxiliary magnet alone having insufficient strength to actuate said movable contact element but together with the aligned similar pole of the first-mentioned magnet being capable of actuating said movable contact element.

6. In combination with a rotameter having a vertical metering tube and a metering float adapted for free up-and-down movement within said tube, an elongated member connected to said float and extending vertically therefrom beyond said metering tube, a bar magnet disposed at the free end of said elongated member, an electrical switch having a magnetically-actuated movable contact element disposed adjacent the path of travel of said magnet, and an auxiliary magnet having one pole disposed adjacent said movable contact element, the pole of said auxiliary magnet alone having insufficient strength to actuate said movable contact element but together with the aligned similar pole of the first-mentioned magnet being capable of actuating said movable contact element, said pole of said auxiliary magnet tending to divert the field of the aligned opposite pole of the first-mentioned magnet thereby to prevent actuation of the movable contact element by said opposite pole.

7. In combination with a rotameter having a vertical metering tube and a metering float adapted for free up-and-down movement within said tube, an elongated member connected to said float and extending vertically therefrom beyond said metering tube, a bar magnet disposed at the free end of said elongated member, an electrical switch having a magnetically-actuated movable contact element disposed adjacent the path of travel of said magnet, and an auxiliary magnet having one pole disposed adjacent said movable contact element, the pole of said auxiliary magnet alone having insufficient strength to actuate said movable contact element but together with the aligned similar pole of the first-mentioned magnet being capable of actuating said movable contact element, said electrical switch together with its auxiliary magnet being vertically adjustable along the path of travel of said first-mentioned magnet to permit actuation of said movable contact element at any predetermined rate-of-flow.

NATHANIEL BREWER.

REFERENCES CITED

The following references are of record in the file of this patent:

UNITED STATES PATENTS

| Number | Name | Date |
| --- | --- | --- |
| 2,307,304 | Rudd | Jan. 5, 1943 |
| 594,323 | Carpenter | Nov. 23, 1897 |
| 1,527,932 | Sperry | Feb. 24, 1925 |